(12) United States Patent
Leonard et al.

(10) Patent No.: US 7,599,789 B2
(45) Date of Patent: Oct. 6, 2009

(54) BEACON-AUGMENTED POSE ESTIMATION

(75) Inventors: Jon N. Leonard, Tucson, AZ (US); Howard E. Neely, III, Santa Monica, CA (US); Ronald T. Azuma, Santa Monica, CA (US); Michael J. Daily, Thousand Oaks, CA (US)

(73) Assignee: Raytheon Company, Waltham, MA (US)

( * ) Notice: Subject to any disclaimer, the term of this patent is extended or adjusted under 35 U.S.C. 154(b) by 458 days.

(21) Appl. No.: 11/420,079

(22) Filed: May 24, 2006

(65) Prior Publication Data

US 2007/0276590 A1    Nov. 29, 2007

(51) Int. Cl.
*G01C 21/26* (2006.01)
(52) U.S. Cl. .................................. 701/207; 382/103
(58) Field of Classification Search ................ 701/220, 701/225, 207; 345/419, 634; 382/103, 104, 382/153, 154; 348/169; 342/357.01, 357.06, 342/417
See application file for complete search history.

(56) References Cited

U.S. PATENT DOCUMENTS

| 6,765,569 | B2 * | 7/2004 | Neumann et al. ........... 345/419 |
| 6,922,632 | B2 * | 7/2005 | Foxlin ......................... 701/207 |
| 2006/0012493 | A1 * | 1/2006 | Karlsson et al. ........ 340/995.24 |

OTHER PUBLICATIONS

Bajura, Mike and Ulrich Neumann. Dynamic Registration Correction in Augmented-Reality Systems. Proceedings of IEEE VRAIS '95 (Research Triangle Park, NC, Mar. 11-15, 1995), 189-196.

Neumann, Ulrich and Youngkwan Cho. A Self-Tracking Augmented Reality System. Proceedings of VRST '96 (Hong Kong, Jul. 1-4, 1996), 109-115.

Welch et al. "High-Performance Wide-Area Optical Tracking: The Hiball Tracking System" Presence: Teleoperators and Virtual Environments vol. 10, #1 (2001), pp. 1-12.

State, Andrei, Gentaro Hirota, David T. Chen, Bill Garrett, and Mark Livingston. "Superior Augmented Reality Registration by Integrating Landmark Tracking and Magnetic Tracking," Proceedings of SIGGRAPH '96 (New Orleans, LA, Aug. 4-9, 1996), 429-438.

Satoh et al. "A Hybrid Registration Method for Outdoor Augmented Reality", Proc. ISAR 2001 (New York City, Oct. 29-30, 2001) pp. 67-76.

Naimark et al. "Circular Data Matrix Fiducial System and Robust Image Processing for a Wearable Vision-Inertial Self-Tracker" Proc. ISMAR 2002 (Darmstadt, Germany, Sep. 30-Oct. 1, 2002) pp. 27-36.

(Continued)

*Primary Examiner*—Dalena Tran
(74) *Attorney, Agent, or Firm*—Eric A. Gifford

(57) ABSTRACT

A beacon-augmented pose estimation system includes positionable beacons that can determine their own 3-D geospatial coordinates and transmit those coordinates back to the pose object. An imaging sensor images the field-of-view of the pose object to provide 2-D image coordinates for any of the beacons in the FOV. A pose object controller processes the sets of 3-D geospatial coordinates and 2-D image coordinates to refine a pose estimate of the pose object. The positionable beacons may include both static beacons that are pre-positioned and mobile beacons that are command-guided to position themselves in the pose object's likely or actual FOV.

25 Claims, 8 Drawing Sheets

OTHER PUBLICATIONS

Jiang et al "A Robust Hybrid Tracking System for Outdoor Augmented Reality" Proc. IEEE Virtual Reality 2004 (Chicago, Mar. 27-31, 2004) pp. 3-10.

Matsushita et al "ID CAM: A Smart Camera for Scene Capturing and ID Recognition" Proc. ISMAR 2003 (Tokyo, Oct. 8-12, 2003), pp. 227-236.

Naimark et a "Encoded LED System for Optical Trackers" Proc. ISMAR 2005 (Vienna, Austria, Oct. 5-8, 2005), pp. 150-153.

Welch, G and G. Bishop "SCAAT: Increment Tracking with Incomplete Information" Proc. SIGGRAPH 1997 (Los Angeles, Mar. 8, 1997), pp. 333-344.

* cited by examiner

BEACON-AUGMENTED POSE ESTIMATION

BACKGROUND OF THE INVENTION

1. Field of the Invention

This invention relates to estimating a pose of a "pose object", and more particularly to augmenting pose estimation with a number of positionable beacons, static and/or mobile, that are configured to determine their three-dimensional (3-D) geospatial coordinates and transmit those coordinates to the pose object.

2. Description of the Related Art

Pose estimation and tracking is critical to applications in precision targeting, augmented reality, and geoinformatics among others. The "pose" of a pose object such as a person, robot, unmanned vehicle, sensor, etc. is typically defined by the object's position information (x,y,z) and orientation (roll, pitch, yaw), which together define a six-dimensional (6-D) pose. In some applications, a 3-D pose consisting of only the orientation is sufficient. It is important that the pose estimate be accurate, timely, trackable over a very wide area and robust in changing environmental conditions.

Under the proper conditions, a Global Position System (GPS) can provide accurate position information and can be used to determine orientation. Position information is obtained with a GPS receiver on the pose object in communication with three or more overhead satellites. For example, heading can be determined for moving platforms, and for large moving platforms, such as large aircraft, yaw and roll can be determined (noisily) if GPS receivers are mounted on the wingtips. However, GPS is often attenuated or blocked due to environmental effects. The pose estimate can be inaccurate and experience additional latency when tracking the estimate. Such GPS based systems are thus not sufficient to meet the demands of most applications.

Numerous systems exist for determining the pose of an object (person) relative to a pre-defined coordinate system. Fixed markers or fiducials, typically hundreds of them, are placed at known 3-D locations, typically in an indoor environment. The person wears a visual-based tracking system that images at least three markers simultaneously to recover 2-D image coordinates for the markers. The tracking system correlates the 2-D image coordinates with the known 3-D locations stored in memory to recover the 6-D pose. In practice, this technique can be unstable unless large numbers of markers are visible (6 or more), which for a narrow field-of-view (FOV) camera means the density of markers in the environment must be very large. These solutions tend to be more robust if the markers are spread widely apart (requiring multiple imagers or a wide field-of-view, but the wide field-of-view spreads the resolution across a large area). Furthermore, if the viewpoint changes rapidly the system can become disoriented and take a long time to reacquire the markers and recover. The first use of markers to correct pose information for Augmented Reality was Bajura, Mike and Ulrich Neumann. Dynamic Registration Correction in Augmented-Reality Systems. Proceedings of IEEE VRAIS '95 (Research Triangle Park, N.C., 11-15 Mar. 1995), 189-196. Other examples of these types of systems are described by: Neumann, Ulrich and Youngkwan Cho. A Self-Tracking Augmented Reality System. Proceedings of VRST '96 (Hong Kong, 1-4 Jul. 1996), 109-115 and Welch et al. "High-Performance Wide-Area Optical Tracking: The Hiball Tracking System" Presence: Teleoperators and Virtual Environments vol. 10, #1 (2001), pp. 1-12. Although useful for known indoor environments, these systems are not useful for applications in which the environment is large or changing.

Another approach is to provide the pose object with a GPS receiver that provides position and an inertial sensor package that provides orientation to first estimate and then track the 6-D pose. However, inertial sensors can provide accurate information only for short periods of time and thus the pose estimate tends to drift. The accuracy of such systems has not been demonstrated to be sufficient for typical applications.

More recently, systems are implementing a hybrid approach using inertial sensors and visualization of fixed markers placed at known 3-D locations. The inertial sensors provide an estimate of the pose. The known 3-D locations are correlated to the 2-D image coordinates to make small corrections to the pose estimate. Such systems should be more robust and have less latency. Bajura was also the first to suggest this hybrid approach, using a magnetic-based system to form the initial pose. Other examples are described by State, Andrei, Gentaro Hirota, David T. Chen, Bill Garrett, and Mark Livingston. "Superior Augmented Reality Registration by Integrating Landmark Tracking and Magnetic Tracking," Proceedings of SIGGRAPH '96 (New Orleans, La., 4-9 Aug. 1996), 429-438; Satoh et al. "A Hybrid Registration Method for Outdoor Augmented Reality", Proc. ISAR 2001 (New York City, 29-30 Oct. 2001) pp 67-76; Naimark et al. "Circular Data Matrix Fiducial System and Robust Image Processing for a Wearable Vision-Inertial Self-Tracker" Proc. ISMAR 2002 (Darmstadt, Germany, 30 Sep.-1 Oct. 2002) pp. 27-36; and Jiang et al "A Robust Hybrid Tracking System for Outdoor Augmented Reality" Proc. IEEE Virtual Reality 2004 (Chicago, 27-31 Mar., 2004) pp. 3-10. These hybrid systems are an improvement over the vision-based or inertial-base only systems. However, these systems depend upon having fixed markers or landmarks at known 3-D coordinates within the FOV of the object over a particular environment. In many applications it is not practicable to populate the environment with enough markers to ensure visualization at sufficiently high revisit rates to accurately track the pose. Furthermore, it is not practical to pre-position the markers with the desired geometry with respect to an object of interest to obtain the most accurate pose estimate.

There remains a need for a practical pose-estimate system that can provide accurate and timely pose estimates over a very wide area in changing environmental conditions.

SUMMARY OF THE INVENTION

The present invention provides a robust and accurate system for pose estimation over a wide area and range of environmental conditions.

This is accomplished by deploying positionable beacons that can determine their own 3-D geospatial coordinates and transmit those coordinates back to the pose object. An imager images the FOV of the pose object to provide 2-D image coordinates for any of the beacons in the FOV. A pose object controller processes the sets of 3-D geospatial coordinates and 2-D image coordinates to refine a pose estimate of the pose object. The initial pose estimate can be determined by a number of different sensor configurations including position and inertial sensors on the pose object alone, in combination with the beacons or by the beacons exclusively. The positionable beacons may include both static beacons that are propositioned and mobile beacons that are command-guided to position themselves in the pose object's likely or actual FOV. Furthermore, a number of pose objects may use the same set of deployed beacons to determine their respective pose. In an embodiment, the mobile beacons are commanded to position themselves around the object, preferably equidistant on either side of an object of interest at the same range point to optimize the accuracy of the pose estimate at the object of interest. The use of moving beacons on platforms such as ground vehicles or aerial vehicles, manned or unmanned, greatly reduces the number of beacons that are required to cover an area, increases the revisit rates of beacons in the pose object's FOV and allows for the control of beacon placement relative to the object of interest. In another embodiment, a SCAAT (Single Constraint At A Time) Kalman filter is used to process each beacon observation as it is obtained thereby updating the pose estimate more frequently, with less latency, and with improved accuracy.

These and other features and advantages of the invention will be apparent to those skilled in the art from the following detailed description of preferred embodiments, taken together with the accompanying drawings, in which:

DETAILED DESCRIPTION OF THE INVENTION

The present invention augments pose estimation with a number of positionable beacons, static and/or mobile, that are configured to determine their 3-D geospatial coordinates and transmit those coordinates to the pose object. The beacons are visualized and the 2-D image coordinates and 3-D geospatial coordinates used to refine and track the pose estimate. The described beacon-augmented system can be used in many environments for many applications including precision targeting, augmented reality (AR), and geoinformatics among others. The invention will now be described for a particular AR application of a soldier, e.g. the pose object, in a battlefield environment.

Figure 1:
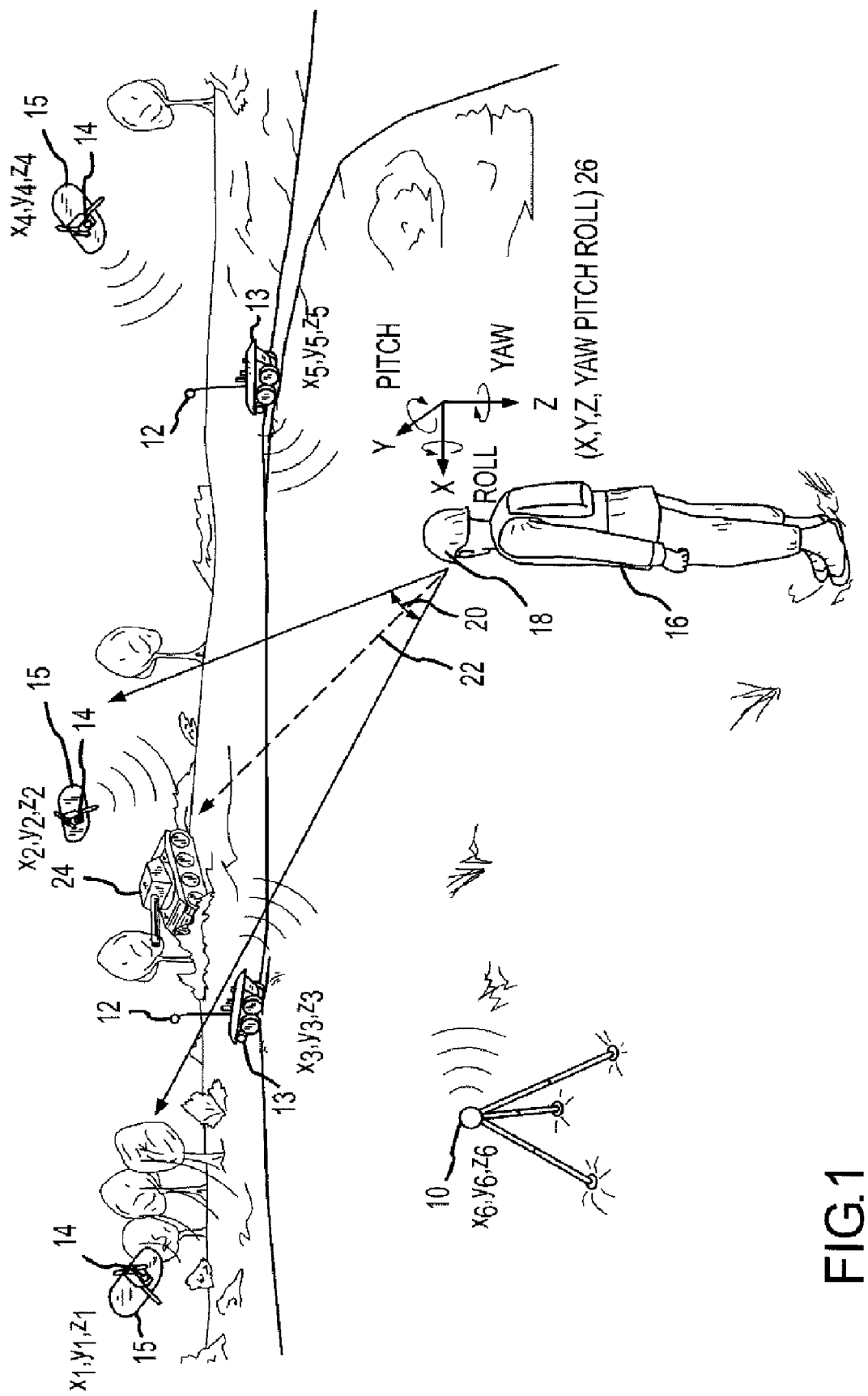
FIG. 1 is a diagram illustrating beacon-augmented pose estimation in accordance with the present invention.

As shown in FIG. 1, positionable beacons 10, 12 and 14 are deployed that can determine their own 3-D geospatial coordinates and transmit those coordinates back to a soldier 16. The soldier's wearable tracking system 18 images a field-of-view (FOV) 20 along the soldier's viewpoint 22 at an object of interest 24 (friendly or opposing forces, landmarks, targets, etc.) to provide 2-D image coordinates for any of the beacons within the FOV. A controller processes the sets of 3-D geospatial coordinates and 2-D image coordinates to refine a pose estimate 26 for the soldier. The initial pose estimate can be determined by a number of different sensor configurations including position and inertial sensors incorporated as part of the soldier-wearable system alone, in combination with the beacons or by the beacons exclusively. The positionable beacons may include both static beacons 10 that are prepositioned and mobile beacons 12 on ground vehicles 13 and mobile beacons 14 on aerial vehicles 15 that are command-guided to position themselves in the soldier's likely or actual FOV. The moving beacons are suitably commanded to position themselves so that beacons are around the object of interest 24, and preferably equidistant on either side of the object at the same range point to optimize the accuracy of the pose estimate on the object of interest. The use of mobile beacons on platforms such as ground vehicles or aerial vehicles greatly reduces the number of beacons that are required to cover a large area, increases the revisit rates of beacons in the pose objects FOV and allows for the control of beacon placement relative to the object of interest. The controller suitably implements a SCAAT (Single Constraint At A Time) Kalman filter to process each beacon observation as it is obtained thereby updating the pose estimate more frequently, with less latency, and with improved accuracy. The system will work with an occasional observation of a single beacon in the FOV. However, the accuracy is improved by having multiple beacons in the FOV simultaneously so that the system is overdetermined, positioning the beacons in the desired geometry with respect to the object and updating the observations more often.

Figure 2A:
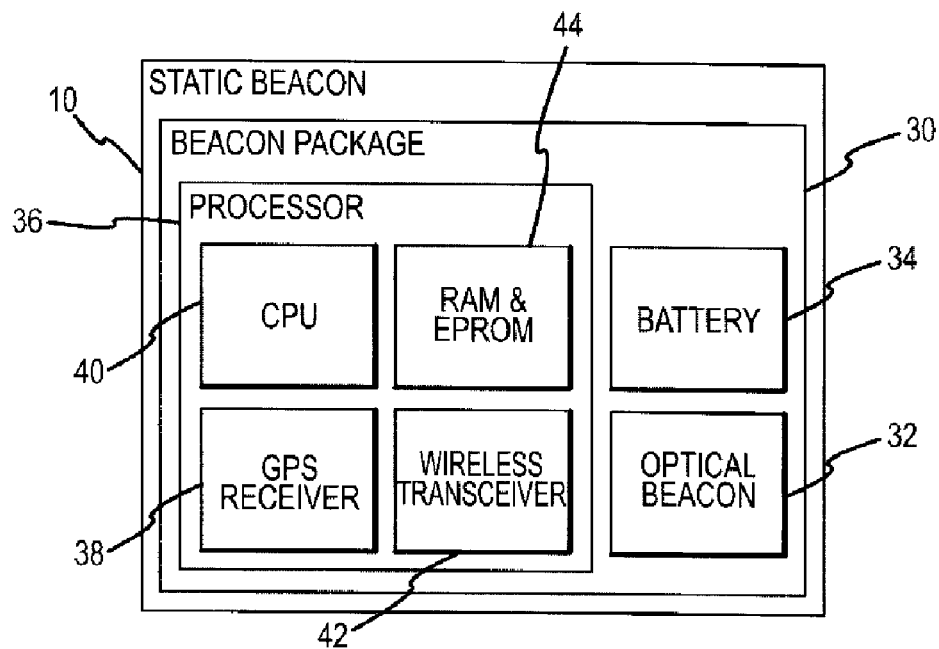
FIGS. 2a and 2b are block diagrams of an exemplary embodiment of a static beacon and a moving beacon.

Before the beacon-augmented system can be used to estimate and track the soldier's pose, the beacons must be deployed and the system initialized. The first step is to deploy the static beacons 10 and mobile beacons 12, 14 into the area of interest. Static beacons 10 can be attached to external walls, or placed on the ground or dropped from an aircraft, and are assumed to not move. For example, the static beacons 10 could be deployed at regular intervals on ingress into the area. As shown in FIG. 2a, in an exemplary embodiment, a static beacon 10 includes a common beacon package 30, which suitably includes an optical beacon 32 such as a laser diode, a battery 34 and a common processor 36. Optical beacon 32 provides a source of bright light at a wavelength in the pass band of the imager. The common processor may modulate the diode to convey identification information for the beacon. Common processor 36 includes a GPS receiver 38 that determines the beacon's latitude, longitude, and altitude measurements (x,y,z) e.g. "3-D geospatial coordinates" and forwards the coordinates to a CPU 40. A wireless transceiver 42 such as Wi-Fi (IEEE Std 802.11) or any appropriate wireless communication system provides data communication between the soldier's wearable tracking system and CPU 40 to transmit the beacon's 3-D geospatial coordinates. RAM and EPROM 44 provide program and database storage and working memory, processor stack, and other functions to CPU 40. The static beacons have the advantage that they can continuously integrate the GPS location, thereby providing a higher degree of accuracy than the mobile beacons can. In some embodiments, sensors (not shown) can be installed into static beacons to detect when one has been moved.

Figure 2B:
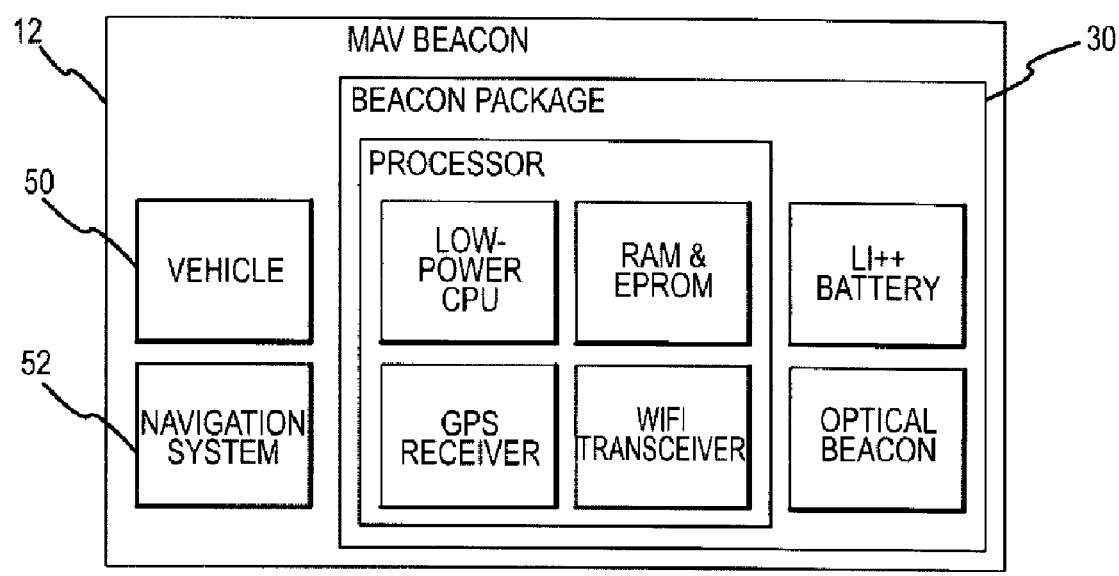

Mobile beacons 12, 14 are typically attached to a ground or air vehicle. For example, the user would launch one or more beacon-equipped micro-aerial vehicles (MAVs) or beacon-equipped unmanned vehicles (UVs) on ingress into the area. As shown in FIG. 2b, in an exemplary embodiment, a mobile beacon 12 (or 14) includes a common beacon package 30 as described above that is mounted on a vehicle 50 and provided with a navigation system 52. Navigation system 52 suitably includes inertial sensors that provide measurements of the beacon's orientation, rate and acceleration. These measurements may be directly measured positions or positions derived from rates. These measurements are used to control the vehicle in response to a guidance command to move the beacon to a desired position. The guidance command may be generated by the soldier's tracking system or possibly from a separate command center. These measurements may also be used on-board the beacon to improve the accuracy of the 3-D geospatial coordinates provided by the GPS receiver. Furthermore, these measurements may be transmitted along with the 3-D geospatial coordinates back to the soldier where they may be used to improve tracking of the pose estimate and possibly to correlate 3-D geospatial coordinates to 2-D image coordinates to identify the beacon.

The mobile beacons have the advantage that they can move into the soldier's likely or actual FOV as the soldier moves through the area of interest. For example, if the mission calls for the soldier to move along a road in a certain area of a town, the mobile beacons could be commanded to preposition themselves in that area on either side of the road. Furthermore, those beacons could respond to commands from the soldier's wearable tracking system to stay or move into the soldier's FOV as it changes. The combination of static and mobile beacons gives the system a set of beacons with high location reporting accuracy but low visual revisit rates and another set of beacons with lower location reporting accuracy but higher visual revisit rates. Simulations have shown that this combination can result in acceptable target location accuracy. With a relatively small number (<10) mobile beacons the system can adapt and cover a large and changing area while maintaining the tracking accuracy of the pose estimate.

After deployment, the second step is for the beacon subsystems to become operable. This may occur at deployment or some later time when the beacons are commanded to initialize. Initialization consists of acquiring position data from GPS and inertial sensors, starting computational elements that filter (e.g., Kalman) position data, and synchronize data with communications and beacon activity. MAV beacons may also require an additional step in which they plan a path to cover a specific area that will be visible from the soldier's location and begin executing the plan. Once the beacon is initialized, the beacon can begin transmitting.

Figure 3:
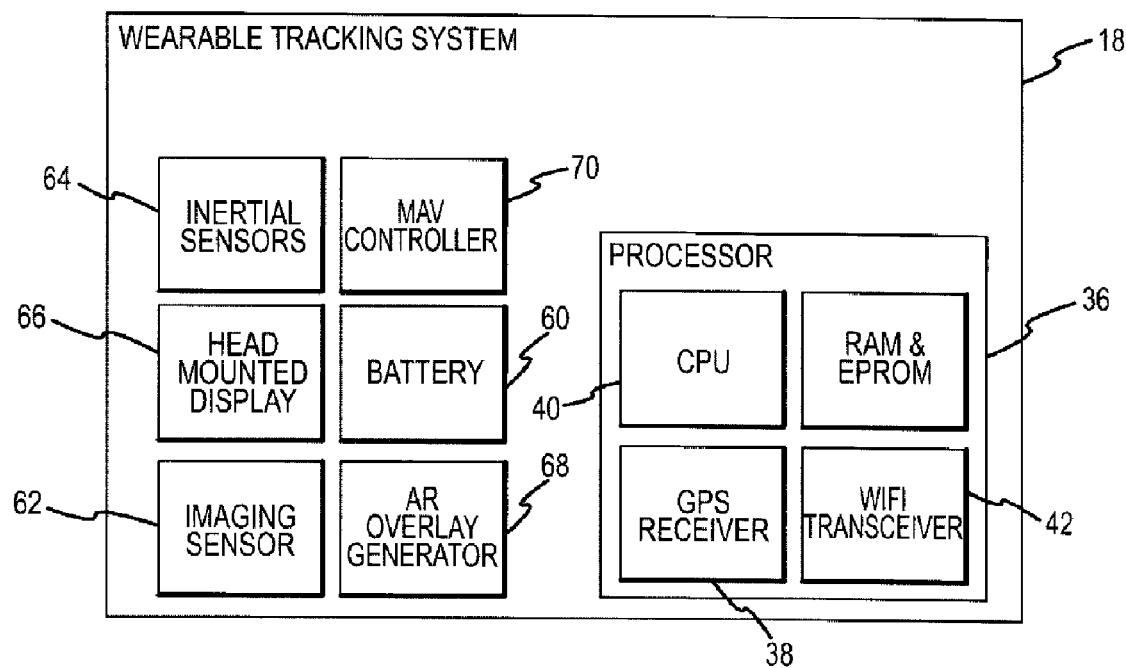
FIG. 3 is a block diagram of a user subsystem.

The third step is to initialize the soldier's wearable tracking system 18. As shown in FIG. 3, in an exemplary embodiment tracking system 18 suitably includes a common processor 36, a battery 60, an imaging sensor 62, inertial sensors 64, a head-mounted display 66, an AR overlay generator 68 and a MAV controller 70. Imaging sensor 62 images a FOV about the soldier's viewpoint. The imaging sensor may be, for example, a short-wave infrared (SWIR) detector that detects "night glow", a long-wave IR (LWIR detector that detects thermal imagery or a visible light detector or it may produce a fused image from all three types of detectors. GPS receiver 38 and inertial sensors 64 provide position and orientation measurements of the soldier. In one embodiment, the inertial sensors include three gyro sensors and two tilt sensors that together provide pitch and roll measurements. To provide an initial pose estimate, the imaging sensor images a single beacon to take a heading or yaw measurement. Alternately, the inertial sensors may include a compass to provide an initial heading measurement. Conversely, if the tracking system is provided with no inertial sensors, the initial pose estimate can be generated by imaging two or more beacons simultaneously. If the tracking system has neither a GPS receiver nor inertial sensors, the system can generate the initial pose estimate by imaging three or more beacons simultaneously. The tracking system begins acquiring image data and processing that data to determine if beacons are present in the current frame. At the same time, communication is initialized through the wireless transceiver 42 to begin receiving position updates from beacons in the area. MAV Controller 70 may send initial guidance commands to one or more mobile beacons to position themselves in the area.

Figure 4:
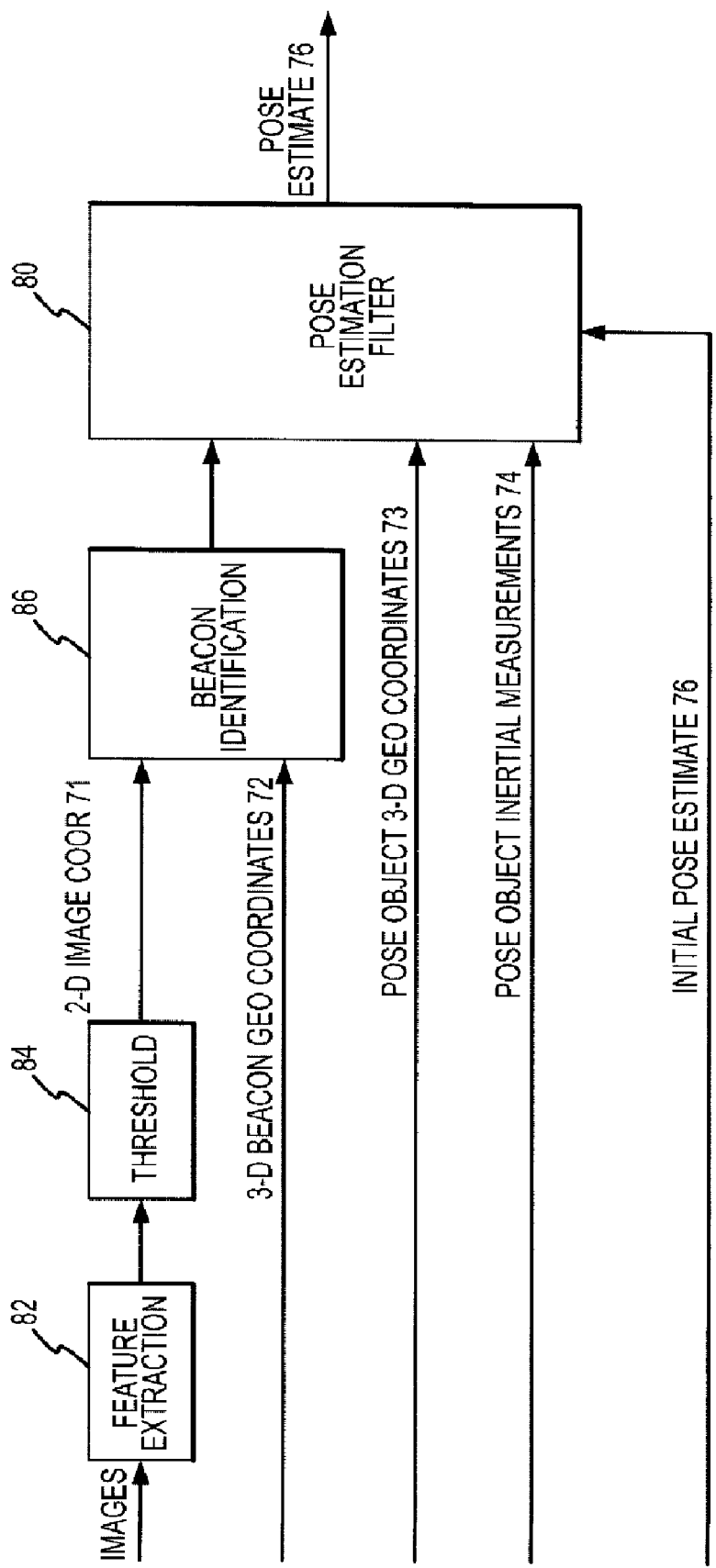
FIG. 4 is a functional block diagram of the pose object controller.

As shown in FIG. 4, once the beacons and tracking system are initialized, beacon sightings are converted into 2-D image coordinates 71, paired with the corresponding 3-D geospatial coordinates 72 and passed to a pose estimation filter 80 along with the pose object 3-D geospatial coordinates 73 and the pose object inertial measurements 74 to refine and track the initial pose estimate 76. In certain configurations of the tracking system, the pose object inertial measurements and/or 3-D geospatial coordinates may not be available.

The process for converting beacon sightings into 2-D image coordinates 71 is essentially the same as the process for visualizing fixed markers or fiducials, is well known in the art, and can be implemented in either the imaging sensor or CPU. The imagery is run through a feature extraction process 82 to extract features that are known to distinguish the beacon. The features are thresholded 84 to provide a 2-D map of the classified beacons. The map may contain zero, one, two or more beacon sightings with their associated 2-D image coordinates. This process is greatly simplified by providing the beacons with a laser diode beacon whose amplitude is modulated in a known pattern.

There are several possible approaches for performing beacon identification 86 to pair the 2-D image coordinates with the 3-D beacon geospatial coordinates. Beacon ID's are encoded by amplitude modulating the beacon's laser diode. The image sensor recognizes the ID and matches it to the ID transmitted with the 3-D coordinates. Exemplary systems are described in Matsushita et al "ID CAM: A Smart Camera for Scene Capturing and ID Recognition" Proc. ISMAR 2003 (Tokyo, 8-12 Oct. 2003), pp. 227-236 and Naimark et a "Encoded LED System for Optical Trackers" Proc. ISMAR 2005 (Vienna, Austria, 5-8 Oct. 2005), pp. 150-153. Welch's HiBall Tracking System temporally multiplexes the beacons. Only one beacon is flashed at any instant of time, so the beacon ID at that time is unambiguous. Different beacons are flashed at different times. This approach requires accurate temporal synchronization between the beacons and the image sensors. Another approach is to use the temporal response of the mobile beacons to identify the mobile beacons and possibly the static beacons. The temporal movement of the beacons in the image plane over a number of frames can be correlated with the temporal movement of the beacons in 3-D space to match the beacons. Once the mobile beacons in the 2-D image space have been identified, the mapping between the 2-D image space and 3-D geospatial space can be used to identify any static beacons in the image. This approach assumes that mobile beacons are observed with sufficiently high revisit rates to maintain beacon identification.

Pose estimation filter 80 computes the pose estimate (position and orientation) given the beacon observations and measurements from the inertial sensors and GPS receiver on the user. The filter may be configured as a multiple or single constraint algorithm. The multiple constraint algorithm recovers the entire 6-D pose estimate. To accomplish this, the tracking system must image enough beacons that the system is at least fully determined. If the tracking system provides five of the six pose measurement then, in theory, a single beacon observation should be sufficient. However, in practice, several simultaneous measurements are required to obtain a robust and accurate pose estimate. This has the effect of significantly reducing the refresh rate of the pose estimate due to the need to observe multiple beacons, preferably at the same time.

A single constraint algorithm known as single-constraint-at-a-time (SCAAT) tracking described in Welch, G and G. Bishop "SCAAT: Increment Tracking with Incomplete Information" Proc. SIGGRAPH 1997 (Los Angeles, 3-8 1997), pp. 333-344. which are hereby incorporated by reference, fuses each individual "insufficient" measurement immediately as it is obtained. With this approach, the tracking system can generate pose estimates more frequently, with less latency, and with improved accuracy. SCAAT tracking uses a Kalman filter to fuse the measurements into a pose estimate but requires an initial pose estimate. The measurement update functions and the state vector for the SCAAT filter are configured depending on what sensor package is used, e.g. object GPS and inertial sensors. A more detailed discussion is provided below in reference to FIG. 6.

For the wearable tracking system 18 show in FIG. 3, the images from imaging sensor 62 are directed to head mounted display 66 that provides images to the soldier and the pose estimate is directed to the AR overlay generator 68 that uses the pose estimate to overlay augmented displays on identified landmarks, friendly forces, enemy forces, etc in the image. Alternately, the tracking system may not include the AR overlay generator or even the HMD and the pose estimate may not be used by the soldier providing the pose information. The pose estimate could be transmitted to a command center, other soldiers, or weapons control and used to provide AR for others or targeting information. In addition, in this embodiment the pose estimates are passed to MAV controller 70, which determines where a MAV beacon should be to improve the probability of being seen by the soldier's imager and further to provide a suitable geometry for estimating pose.

Figure 5A:
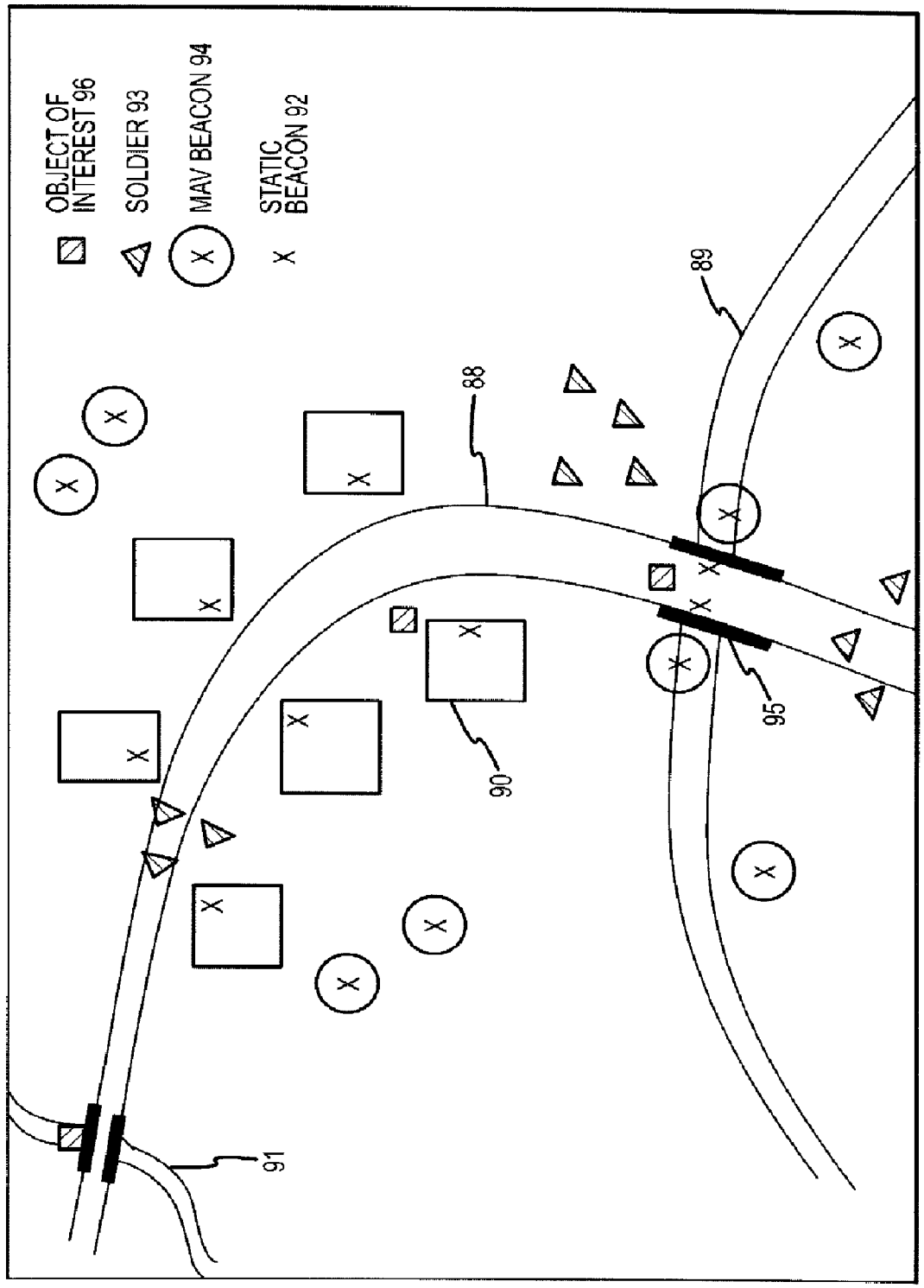
FIGS. 5a through 5c are diagrams illustrating the use of positionable beacons in a battlefield scenario.
Figure 5B:
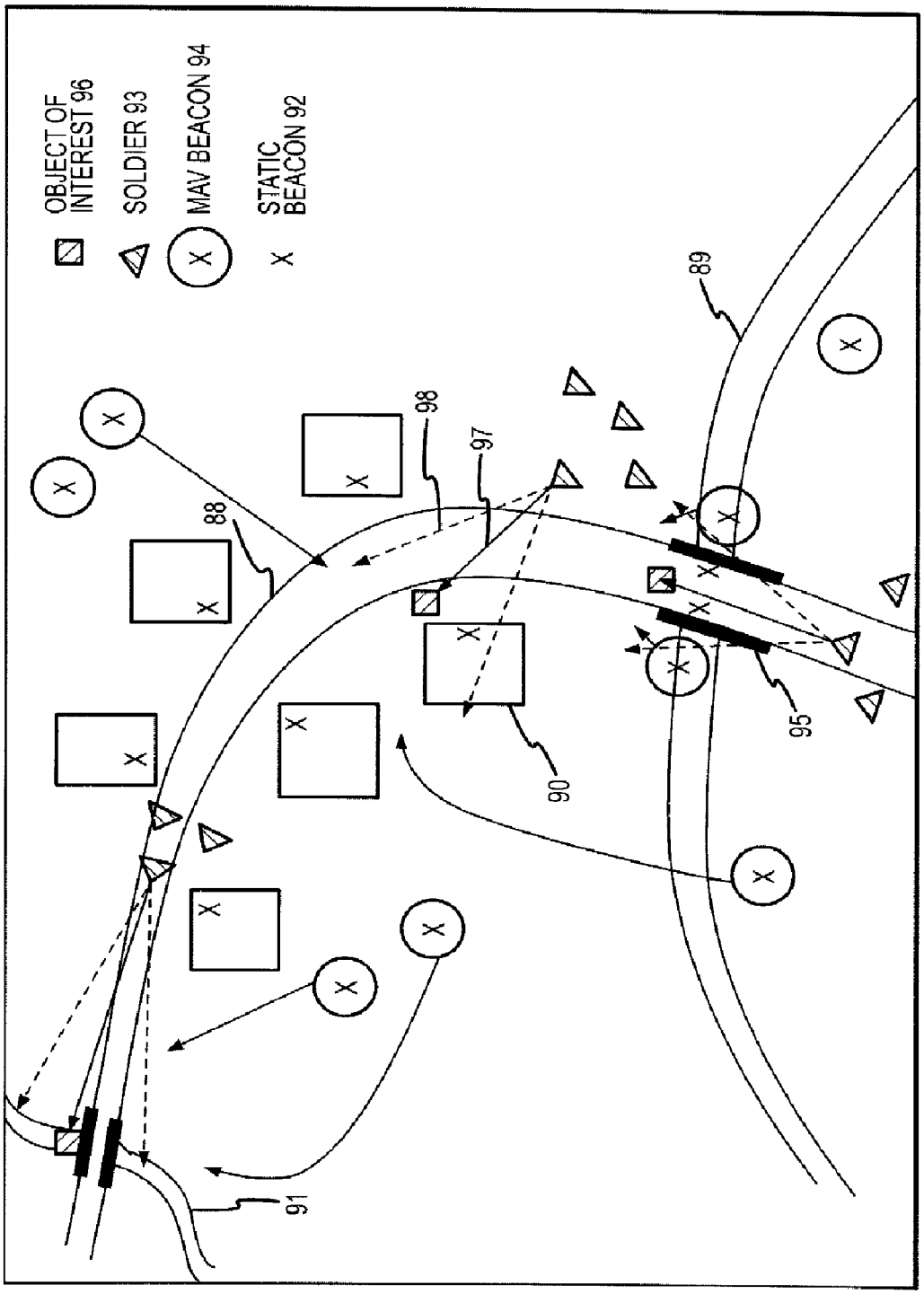
Figure 5C:
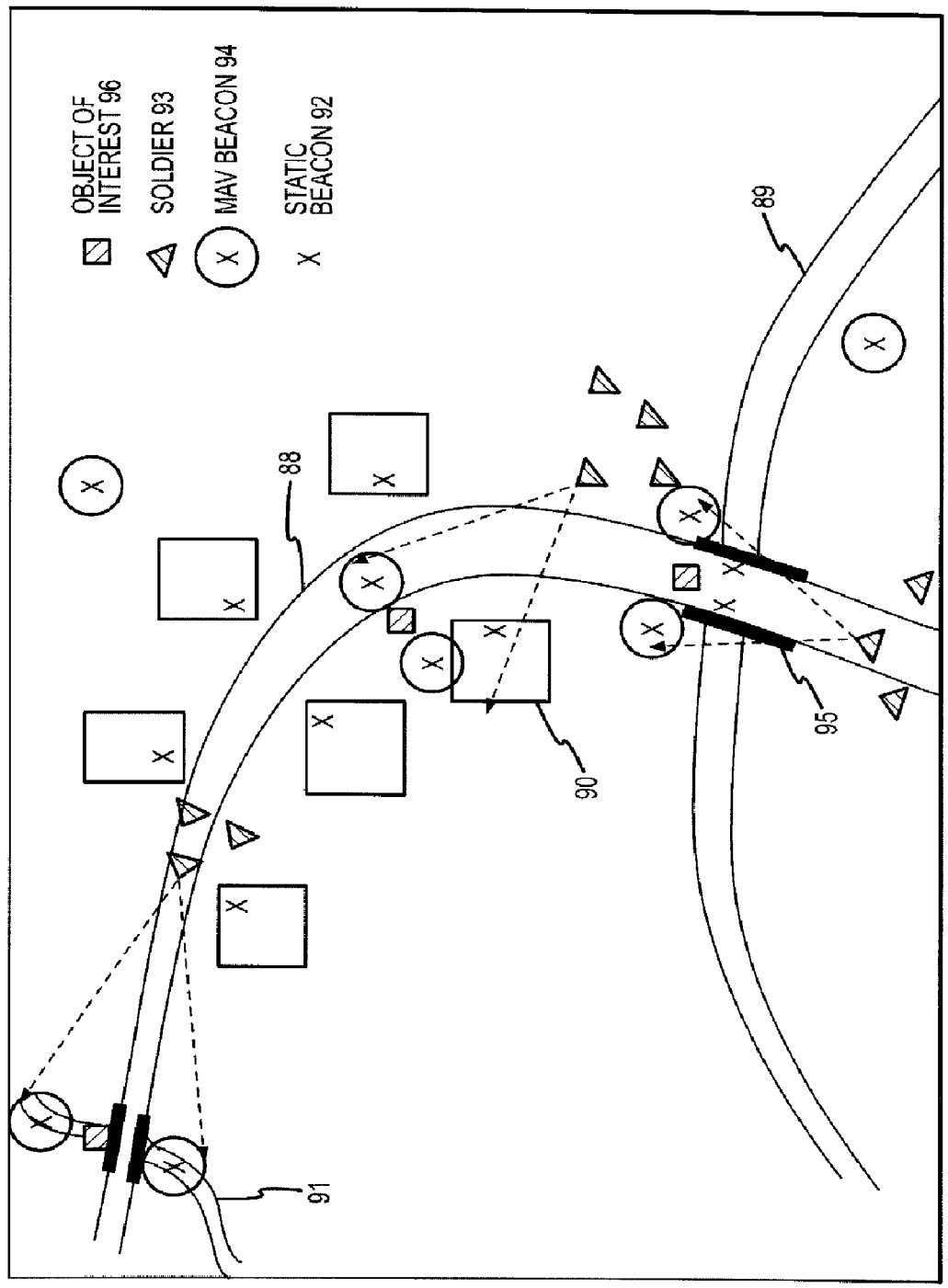

FIGS. 5a through 5c illustrate an example of an application of the beacon-augmented pose estimation system in a simple battlefield scenario. As shown in FIG. 5a, a road 88 crosses a river 89, winds its way through an urban environment with buildings 90 on either side of the road and then crosses a ditch 91. Static beacons 92 have been pre-positioned on the buildings 90 based on the expectation that soldiers 93 will move through that area frequently. Mobile beacons 94 have been moved into the area with the soldiers. In particular, a pair of mobile beacons 94 have been pre-positioned on either side of a bridge 95 over river 89 that has been, for example, identified as a particularly dangerous area and/or one that is hard for the soldiers to visualize. Objects of interest 96 including friendly soldiers, enemy soldiers, jeeps, weapon systems, etc are shown on bridge 95, behind a building 90 and in ditch 91.

As shown in FIG. 5b, the lead soldier 93 in each group (for simplicity) has activated his or her tracking system and is looking along a viewpoint 97 at different objects of interest 96. The system's image sensor images a FOV 98 around the object. The tracking systems have been initialized and based on the initial pose estimates, guidance commands have been transmitted to MAV beacons 94 directing them to move into the soldier's FOV around the object of interest. As shown in FIG. 5c, a pair of MAV beacons 94 have positioned themselves within the soldier's FOV on either side and equidistant to the object of interest at the same range point as the object. As shown, for two of the soldier's static beacons 92 also lie within the FOV and will provide information to update the pose estimate. Although not optimally positioned, the static beacons generally provide more accurate geospatial coordinates. However, if the MAV beacons can hover, they can integrate their GPS measurements over time and may improve their accuracy.

As mentioned above, the SCAAT filter is a specific type of Kalman filter that allows measurement updates from individual sensor components where each individual sensor measurement may be insufficient to fully determine the state. An exemplary embodiment of the SCAAT filter is very similar to that described by Welch and Bishop except that the measurement update functions and the state vectors are configured for object GPS, object gyro and beacon observations.

The tracking system is attempting to measure the pose of a head with respect to a World coordinate system. In our World coordinate system the X axis points east, the Y axis points north, and the Z axis points straight up out of the ground. The origin of our Word coordinate system is suitably an arbitrary location in the battlespace but with well known latitude, longitude and altitude. In our Head coordinate system, the X axis points to the right, the Y axis points straight up, and Z points opposite the direction of gaze (this is chosen to match what our graphics systems uses for rendering). The origin of the Head coordinate system is at the user's right eye location.

The "pose" that is the transformation between World space and Head space. The "world_from_head" transformation rotates and translates the World space coordinate axes to coincide with the Head space coordinate axes. This is equivalent to rotating points and vectors from Head space to World space.

The SCAAT filter maintains the following values:
    X=the state vector, an N by 1 vector.
    P=the covariance matrix estimating the error in the state X. This is N by N.
    G=Global orientation, stored as a quaternion. This represents a "world_from_head" orientation.
    t=time in seconds The state vector X is:
    $X=[tx\ ty\ tz\ dtx\ dty\ dtz\ roll\ pitch\ yaw\ d\_roll\ d\_pitch\ d\_yaw]^T$ where:
    tx, ty, tz=translation (world_from_head) in meters
    dtx, dty, dtz=translational velocities (derivatives of tx, ty, tz)
    roll, pitch, yaw=Incremental orientation away from the global orientation. Roll is positive rolling left around the Head space Z axis, pitch is positive pitching up around the Head space X axis, and Yaw is positive yawing left around the Head space Y axis. These are in radians per second.
    d_roll, d_pitch, d_yaw=orientation velocities (derivatives of roll, pitch, yaw)

Figure 6:
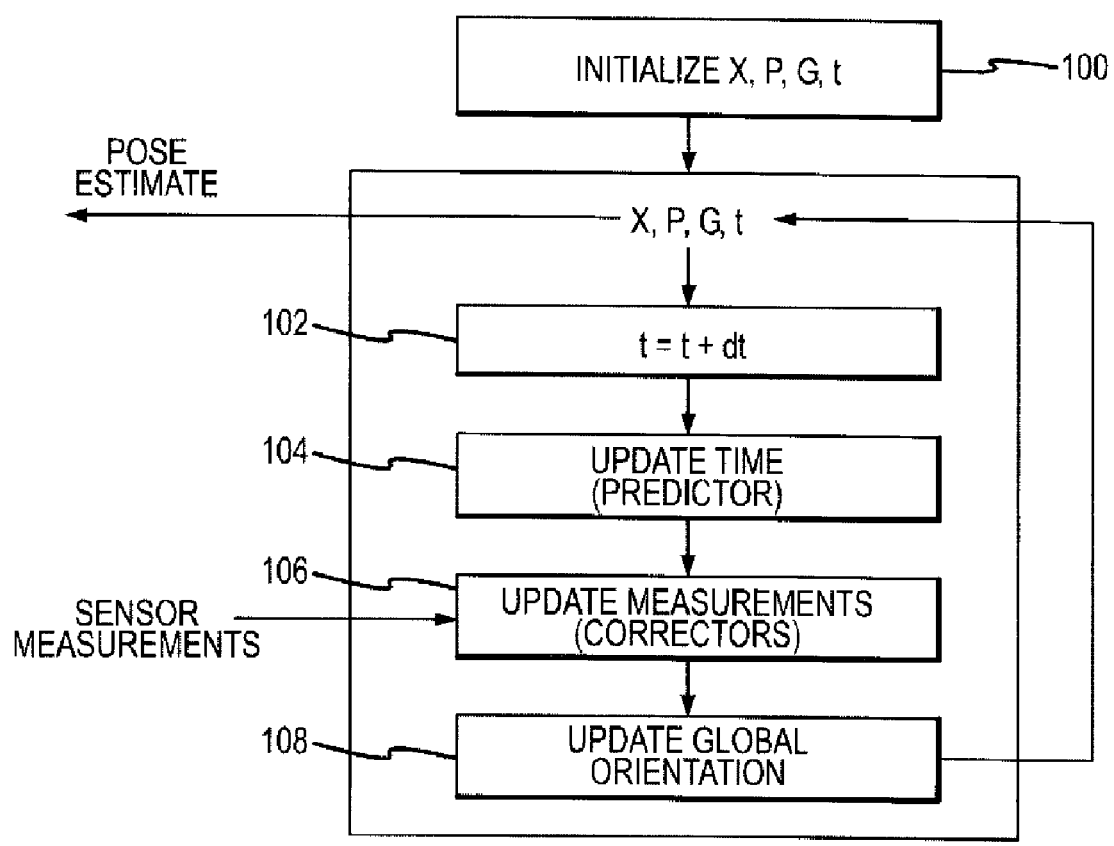
FIG. 6 is a flow diagram of a SCAAT filter used to process the beacon data and refine the pose estimate.

As shown in FIG. 6, the SCAAT filter starts by initializing X, P, Global orientation and time (step 100). Time is set to the initial time. The initial translation provided by the object GPS receiver sets tx, ty, and tz in X and the other nine values in X are set to zero. The initial orientation determines Global orientation G. All values of P are set to zero except for:
    P[0][0]=position_noise
    P[1][1]=position_noise
    P[2][2]=position_noise
    P[6][6]=orientation_noise
    P[7][7]=orientation_noise
    P[8][8]=orientation_noise Once initialized the Kalman filter enters the main loop. Because the SCAAT filter runs as a discrete Kalman filter, each time step occurs at a fixed time interval, dt. For example for a filter running at 1000 Hz, dt=1 millisecond. At each timestep, the filter advances time by dt (step 102), updates time (step 104), updates measurements (step 106) and updates the global orientation (step 108). The actual capture time of measurements from the beacons will be earlier than the time at which these measurements are used to update the filter, however one skilled in the art will see that, for the small transport latencies due to the wireless network and on-beacon processing, the errors introduced by these latencies are small compared to the measurement errors of the geospatial position sensors, such as GPS. At the end of any step, the current pose estimate from the tx, ty, and tz values in the state vector X and the global orientation G. During each time step, the number of measurement update steps varies depending upon the availability of sensor input. There might be zero, one, or several measurement update steps.

Update Time:

The "update time" step describes how the values in the state vector X change, in the absence of any input. Of course, the expected error will grow with time as you do this. Therefore the values in P tend to increase with each time update. The time update is executed by computing the following two equations:

$$X_{new} = A * X_{original} \text{ (matrix multiply)}$$

$$P_{new} = A * P_{original} * A^T + Q \text{ (matrix multiplies, addition)}$$

where A is an N by N matrix that describes how the state changes linearly with time, and Q is an N by N matrix adding the noise introduced by this process.

A simple mode for A is the equivalent of:
new position=original_position+velocity*time
new_velocity=original_velocity Therefore A is first set to be the identity matrix and the following values are modified:
A[0][3]=dt
A[1][4]=dt
A[2][5]=dt
A[6][9]=dt
A[7][10]=dt
A[8][11]=dt Q is set to reflect the uncertainty added by this process.

Update Measurements:

There are three different measurement update steps available, one each for GPS position, the rate gyroscopes, and a beacon observation.

A measurement update is run if there is a sensor measurement for the current timestep. Since the gyroscopes are sampled at the filter frequency of 1 kHz, a gyro update is always performed. However, beacons are only spotted at the rate of the camera (30 Hz) and GPS updates are even less frequent (maybe 2 Hz). Therefore in most timesteps there will not be a beacon or GPS measurement update.

Each type of update has a different update function h_func( ):
Z=h_func_GPS( )
Z=h_func_gyro( )
Z=h_func_beacon( )

where each function produces a measurement vector Z. This vector states what the expected sensor measurement should be, given the current state X. The size of Z will vary depending on the type of measurement. For a GPS measurement, Z is 3 by 1 (the 3 position values). For a gyro measurement, Z is 3 by 1 (the 3 incremental orientation velocities). For a beacon measurement, Z is 2 by 1 (the observed x,y coordinates of the beacon as seen in the camera's 2D sensor). Let F be the number of entries in Z.

The measurement update is controlled by the following computations:

Set $Z_{measured}$ to what the sensors measure.

$$K = P_{original} * H^T * (H * P_{original} * H^T + R)^{-1}$$

$$Z_{predicted} = \text{h\_func}( )$$

$$Z_{residual} = Z_{measured} - Z_{predicted}$$

$$X_{new} = X_{original} + K * Z_{residual}$$

$$P_{new} = (I - K * H) * P_{original}$$

where K is an N by F matrix, called the Kalman gain, H is the F by N Jacobian matrix that holds the partial derivatives of h_func( ) with respect to the state X, R is the F by F noise matrix that states the errors in the measurement, and I is the N by N identity matrix.

The h_func( ) for the gyros and the GPS measurements is pretty simple. The predicted measurements correspond one-to-one with values in the state vector X. To derive h_func_beacon( ) the system must compute where the 3D beacon position should appear as an image in the camera's 2D coordinate system. This is accomplished with coordinate spaces World space, Head space, and a New_head space created by applying the current incremental rotation on Head space. The first step is to move the head to the origin and translate the beacon's position in the same way, thus moving everything into a "relative World space". The beacon position is rotated from relative World space to Head space (this uses the global orientation G) and then rotated to New_head space (using the incremental orientation component in state X). At this point, we check whether the beacon is within the sensor's field of view. If this check fails, the measurement update is abandoned. If not, the range along the Z axis is divided to effect the perspective division, then scaled into coordinates to the get 2D x,y pixel coordinates of where the image sensor should see the beacon.

Update Global Orientation:

The non-zero incremental orientation (the roll, pitch, and yaw values inside state X) are used to rotate the global orientation. Thereafter the incremental roll, pitch and yaw values inside X are set to zero. These incremental angles should be very small, since they represent the change in orientation for 1 millisecond of time. Therefore we can use the small angle assumption and change Global orientation G (a quaternion) as follows:

Q_increment is a quaternion, where:
Q_increment[qw]=1
Q_increment[qx]=X[7]/2 [pitch/2]
Q_increment[qy]=X[8]/2 [yaw/2]
Q_increment[qz]=X[6]/2 [roll/2]
$G_{new} = G_{original} *$ Q_increment (quaternion multiply)
Normalize $G_{new}$ to get the new value of G
X[6]=0 (clear the incremental rotation)
X[7]=0
X[8]=0

Mathematical operations on quaternions are described in Ken Shoemake. Quaternion Calculus for Animation. Proceedings of SIGGRAPH 1989: Course Notes #23 on Math for SIGGRAPH (Boston, Mass., 31 Jul.-4 Aug. 1989).

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A beacon-augmented system for determining a pose of a pose object, comprising:

At least one positionable beacon configured to determine and transmit its 3-D geospatial coordinates, including at least one moveable beacon mounted on a vehicle;

An imager on a pose object configured to image a field-of-view (FOV) and to determine a 2-D image coordinates for at least one said beacon in the FOV, said at least one moveable beacon responsive to a command to position the moveable beacon in the imager's FOV; and A pose object controller configured to process the at least one set of 3-D geospatial coordinates and 2-D image coordinates to refine a pose estimate of the pose object.

2. The system of claim 1, further comprising:

A sensor package that provides inertial measurements of the pose object to determine the pose estimate.

3. The system of claim 2, wherein the sensor package provides roll and pitch measurements.

4. The system of claim 3, wherein the imager images one said positionable beacon to provide a yaw measurement, said pose object controller using said roll, pitch and yaw measurements to determine the pose estimate.

5. The system of claim 4, wherein the pose estimate is a 6-D pose estimate, said sensor package further comprising a GPS receiver that provides 3-D geospatial coordinates of the pose object, said pose object controller using said pose object 3-D geospatial coordinates and said roll, pitch and yaw measurements to determine the 6-D pose estimate.

6. The system of claim 1, wherein said at least one positionable beacon includes a GPS receiver to determine its 3-D geospatial coordinates.

7. The system of claim 1, wherein the pose object controller transmits the command to position the moveable beacon in the imager's FOV.

8. The system of claim 1, wherein the pose object controller issues commands to position the moveable beacon near an object of interest in the imager's FOV.

9. The system of claim 1, wherein at least one said positionable beacons includes at least one static beacon and at least one said moveable beacon.

10. The system of claim 9, wherein the vehicle for at least one said moveable beacon is an unmanned aerial vehicle.

11. The system of claim 1 including a plurality of said positionable beacons, said imager imaging a subset of said plurality in its FOV and providing the 2-D image coordinates to the pose object controller where they are matched with the respective 3-D beacon geospatial coordinates into said sets, said pose object controller processing each set one at a time to refine the pose estimate.

12. The system of claim 11, wherein said object controller includes a Single Constraint at A Time (SCAAT) filter that processes the 2-D image coordinates and 3-D geospatial coordinates to refine the pose estimate.

13. The system of claim 1, further comprising a plurality of pose objects each having an imager and a pose object controller that utilize a common set of said at least one positionable beacon to refine a pose estimate for each pose object.

14. A beacon-augmented system for determining a pose of a pose object, comprising;

At least one positionable beacon configured to determine and transmit its 3-D geospatial coordinates including at least one moveable beacon mounted on a vehicle;

An imager on a pose object configured to image a field-of-view including at least one said positionable beacon and to determine each said beacon's 2-D image coordinates; and A pose object controller configured to issue commands to position a pair of moveable beacons approximately equidistant on either side of an object of interest in the imager's FOV at approximately a same range point as the object and process the 3-D geospatial coordinates and 2-D image coordinates to refine a pose estimate of the pose object.

15. A beacon-augmented system for determining a pose of a pose object, comprising:

At least one positionable beacon configured to determine and transmit its 3-D geospatial coordinates including at least one moveable beacon mounted on a vehicle;

An imager on a pose object configured to image a field-of-view including at least one said positionable beacon and to determine each said beacon's 2-D image coordinates; and A pose object controller configured to issue commands to position multiple pairs of beacons approximately equidistance on either side of an object of interest in the imager's FOV at different heights at approximately a same range point as the object and process the 3-D geospatial coordinates and 2-D image coordinates to refine a nose estimate of the pose object.

16. A system for determining a pose of a pose object, comprising:

A plurality of positionable beacons each configured to determine and transmit its 3-D geospatial coordinates including at least one moveable beacon;

An imager on a pose object configured to image a field-of-view (FOV) and to determine 2-D image coordinates for at least one said beacon in the FOV, said at least one moveable beacon responsive to a command to position the moveable beacon in the imager's FOV;

A GPS receiver on the pose object to provide its 3-D geospatial coordinates;

An inertial sensor on the pose object to provide its pitch and roll; and

A pose object controller configured to process a set of beacon 3-D geospatial coordinates and 2-D image coordinates to estimate a pose object yaw and provide an initial 6-D pose estimate of the pose object and thereafter to process the at least one set of beacon 3-D geospatial coordinates and 2-D image coordinates to refine the 6-D pose estimate.

17. The system of claim 16, wherein said plurality of positionable beacons includes at least one static beacon and at least one said moveable beacon.

18. The system of claim 17, wherein the pose object controller transmits the command to position the moveable beacon in the imager's FOV.

19. The system of claim 16, wherein said imager images a subset of said plurality of beacons in its FOV and provides the 2-D image coordinates to the pose object controller where they are matched with the respective 3-D beacon geospatial coordinates into said sets, said pose object controller processing each set one at a time to refine the pose estimate.

20. The system of claim 19, wherein said object controller includes a Single Constraint at A Time (SCAAT) filter that processes the 2-D image coordinates and 3-D geospatial coordinates to refine the pose estimate.

21. A method for determining a pose of a pose object, comprising:

Deploying at least one positionable beacon configured to determine and transmit its 3-D geospatial coordinates including at least one moveable beacon;

From a pose object, imaging a field-of-view (FOV);

Issuing a command to position the moveable beacon in the FOV;

Determining said moveable beacon's 2-D image coordinates;

Providing an initial pose estimate of the pose object; and

Processing the at least one set of 3-D geospatial coordinates from the moveable beacon and 2-D image coordinates for the moveable beacon to refine the pose estimate of the pose object.

22. The method of claim 21, wherein commands are issued to position multiple pairs of moveable beacons approximately equidistant on either side of an object of interest in the imager's FOV at different heights at approximately the same range point as the object.

23. The method of claim 21, wherein the command is initiated from the pose object.

24. The method of claim 21, wherein a pair of said beacons are positioned approximately equidistant on either side of an object of interest in the imager's FOV at approximately the same range point as the object.

25. The method of claim 21, wherein at least one static beacon and at least one said moveable beacon are deployed.

* * * * *

UNITED STATES PATENT AND TRADEMARK OFFICE
CERTIFICATE OF CORRECTION

PATENT NO.         : 7,599,789 B2                                                    Page 1 of 1
APPLICATION NO. : 11/420079
DATED              : October 6, 2009
INVENTOR(S)        : Leonard et al.

It is certified that error appears in the above-identified patent and that said Letters Patent is hereby corrected as shown below:

In column 10, claim 1, line 64, delete "a" and insert --the--;

In column 12, claim 15, lines 9-10, delete "equidistance" and insert --equidistant--.

Signed and Sealed this

Fifth Day of January, 2010

David J. Kappos
*Director of the United States Patent and Trademark Office*

UNITED STATES PATENT AND TRADEMARK OFFICE
CERTIFICATE OF CORRECTION

PATENT NO.      : 7,599,789 B2                                     Page 1 of 1
APPLICATION NO. : 11/420079
DATED           : October 6, 2009
INVENTOR(S)     : Leonard et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 563 days.

Signed and Sealed this

Twenty-eighth Day of September, 2010

David J. Kappos
*Director of the United States Patent and Trademark Office*